United States Patent [19]
Williams et al.

[11] Patent Number: 4,837,585
[45] Date of Patent: Jun. 6, 1989

[54] CONTINUOUS INK JET PRINTER HAVING IMPROVED SYSTEM FOR REDUCING PRESSURE VARIATIONS

[75] Inventors: Theodore F. Williams, Dayton; James A. Katerberg, Kettering, both of Ohio; Lawrence R. Young, West Lebanon, N.H.; James D. Isaacson, Denver, Colo.

[73] Assignee: Eastman Kodak Company, Rochester, N.Y.

[21] Appl. No.: 185,738

[22] Filed: Apr. 25, 1988

[51] Int. Cl.[4] .............................................. G01D 15/18
[52] U.S. Cl. .................................. 346/75; 346/140 R
[58] Field of Search .............................. 346/75, 140 R

[56] References Cited

U.S. PATENT DOCUMENTS 4,106,032 8/1978 Miura et al. .................... 346/140 R

*Primary Examiner*—Elliot A. Goldberg
*Assistant Examiner*—Gerald E. Preston
*Attorney, Agent, or Firm*—John D. Husser

[57] ABSTRACT

An improved damping system for continuous ink jet printers of the kind having: (i) a print head, including an ink cavity and an orifice plate coupled to the cavity, and (ii) an ink circulation system having an ink supply conduit to the print head cavity inlet and an ink return conduit coupled to the cavity outlet. The damping system reduces ink pressure transients within said print head means and includes: (i) a damping chamber for enclosing a gas-over-ink region that is coupled to the ink return conduit at a location proximate the print head and (ii) a printer subsystem for periodically introducing gas into said ink return conduit upstream of the damper chamber.

8 Claims, 3 Drawing Sheets

CONTINUOUS INK JET PRINTER HAVING IMPROVED SYSTEM FOR REDUCING PRESSURE VARIATIONS

FIELD OF THE INVENTION

The present invention relates to continuous ink jet printers and more particularly to improved constructions that cooperate with the ink circulation systems of such printers to dampen transients that can occur in the print head ink pressure, e.g. in response to transverse accelerations and decelerations of the print head.

BACKGROUND OF THE INVENTION

In continuous ink jet printers, streams of uniformly spaced ink drops are created by imposing predetermined vibrations upon liquid ink filaments issuing from an orifice plate. The filaments are formed by supplying ink under pressure to a print head cavity that is in communication with the orifice plate. Information is imparted to the droplet streams by selective non-charging or charging and deflection of droplets. A portion of the droplets pass to the recording medium but there are a substantial number of non-printing droplets that are intercepted by a catcher for recirculation. Usually the print head cavity has an ink return outlet (e.g. to facilitate dynamic pressure control within the cavity at start-up), and the printer's ink supply system also recirculates such return ink flow.

In addition to several other parameters, including stimulation frequency and ink viscosity, accuracy of the drop placements by a continuous ink jet printer is importantly dependent on maintaining a highly uniform ink-ejecting pressure for forcing ink streams through the print head orifices. Ejection pressure deviations will cause errors in drop velocities and, ultimately, placement error of printing drops. One way to control the ink ejecting pressure in a continuous ink circulation system is to detect the pressure of the ink in the return line from the print head and adjust the ink supply pump so that the desired pressure exists in a steady state condition (wherein some supplied ink is issuing from the print head orifices and some supplied ink is passing through the print head to the return line and its sensor).

When continuous ink jet printing is effected with a stationary print head (e.g. the print media movement providing the printing scan), the above-described pressure control system is adequate (from the pressure parameter viewpoint) to assure highly accurate drop placements. However, there are highly useful continuous ink jet printer configurations wherein the print head moves, e.g., wherein a print head having a line width array of nozzles is sequentially indexed with respect to a print media, rotating on a drum, to print sequential lines on that medium. In those configurations, we have found that the accelerations and decelerations incident to movement of the print head can give rise to drop placement errors. More particularly we have determined that line indexing of the print head and its umbilical ink conduits cause accelerations and decelerations of ink therein, which in turn give rise to ink pressure variation, drop velocity variations and thus drop placement errors.

U.S. Pat. Nos. 4,347,524 and 4,575,738 illustrate examples of the known technique of reducing shock pulses by providing a flow restrictor and a fluid reservoir in the supply line of drop-on-demand printers. Such systems function in the manner of a series-resistor, shunt-capacitor RC network to attenuate pressure pulses in the supply line and thus prevent air ingestion and/or premature drop ejection. As explained in the U.S. Pat. No. 4,575,738, the capacitive component of such a system is best effected by a chamber portion having a compressible gas (e.g. air) and ink interface. However, the gas/ink interface construction has heretofore suffered the difficulty that the ink absorbs the gas and decreases the system capacitance. Therefore, resilient membranes have been used, either instead of the compressible gas, or to separate the ink from the compressible gas. However, neither of these alternatives are as desirable as the unseparated gas/ink interface system.

SUMMARY OF INVENTION

One significant purpose of the present invention is to provide, in continuous ink jet printers, systems which substantially reduce the pressure transients that are incident to traversing movements of the print head. These circulation systems yield higher print quality by minimizing those drop placement errors that result from ink pressure variations.

In one preferred embodiment the system includes a compressible-fluid damper device constructed and located in the ink circulation of a continuous ink jet printer having a programmed start-up sequence that utilizes air ingestion to clean the orifices. The damper device includes an air chamber located downstream from the printer's orifice so that replenishment of the damper device's air content is effected during start-up sequences.

Thus in one aspect the present invention constitutes, in continuous ink jet printers of the kind having (i) a movable print head, which includes an ink cavity, an ink inlet and outlet to the cavity and an orifice plate coupled to the cavity and (ii) an ink circulation system having an ink supply conduit for supplying ink under pressure to the cavity inlet and an ink return conduit for receiving ink from the cavity outlet, an improved construction for damping print head ink pressure transients. The damping construction comprises a housing for enclosing a compressible fluid within a damping chamber that is located along the ink return conduit, proximate the print head, whereby ink ingested into the ink return line through the orifice plate replenishes the damping device's compressible fluid content.

BRIEF DESCRIPTION OF THE DRAWINGS

The subsequent description of preferred embodiments of the present invention refers to the attached drawings wherein.

DETAILED DESCRIPTION OF PREFERRED EMBODIMENTS

Figure 1:
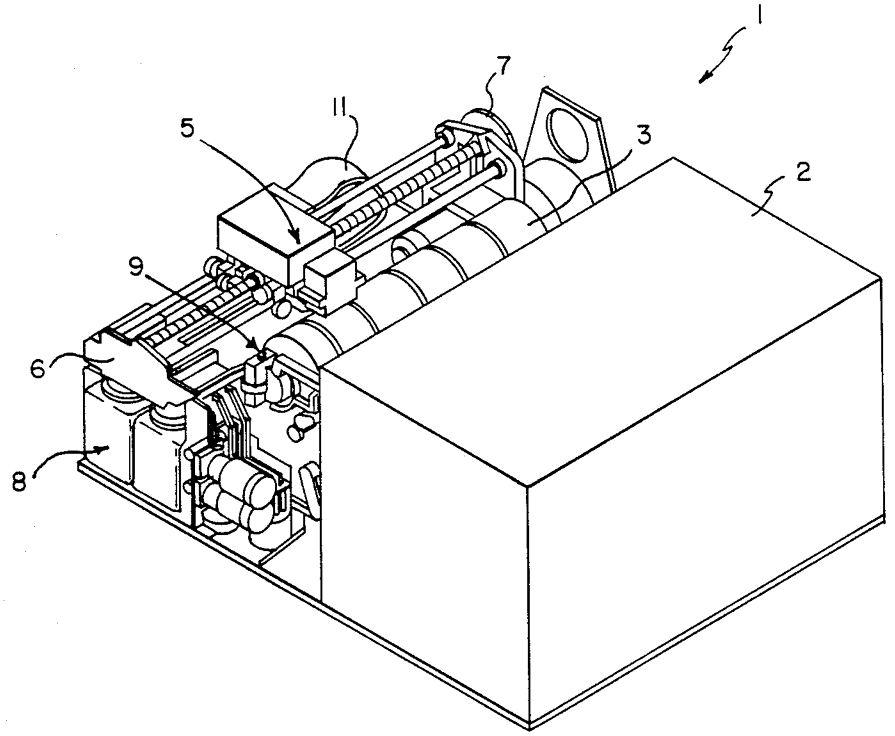
FIG. 1 is a perspective view of one embodiment of ink jet printing apparatus with which the present invention is useful.

FIG. 1 illustrates one continuous ink jet printing apparatus 1 of a the kind having a moving print head assembly with which the present invention is particularly useful. In general, the printer apparatus 1 comprises a paper feed and return sector 2 from which sheets are transported into and out of operative relation on printing cylinder 3. The detail structure of the sheet handling components do not constitute a part of the present invention and need not be described further. The print head assembly 5 is mounted on carriage assembly 6 for movement by appropriate drive means 7. During printing operation the print head assembly is traversed across a print path in closely spaced relation to a print sheet which is rotating on cylinder 3. Ink is supplied to and returned from the print head assembly by means of flexible conduits 11 which are coupled to ink cartridge(s) 8. A storage and start-up station 9 is constructed adjacent the left side (as viewed in FIG. 1) of the operative printing path of print head assembly 5. The drive means 7 and carriage assembly 6 are constructed to transport particular portions of the print head assembly into operative relations with station 9 at appropriate sequences of the operative cycles of the printer.

Figure 2:
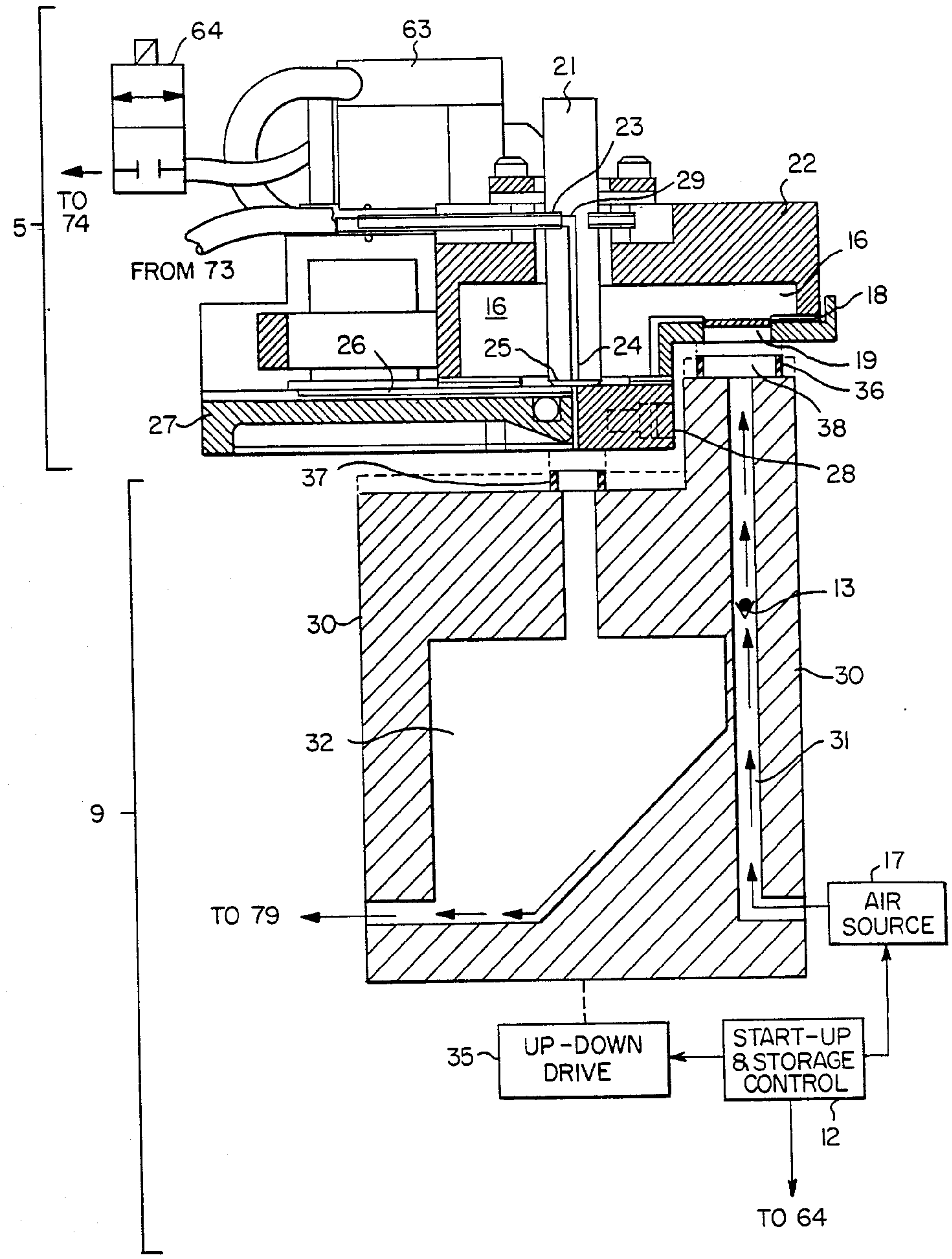
FIG. 2 is a schematic cross-sectional view of a portion of the FIG. 1 printer illustrating its upper and lower print head assemblies and their cooperative relation with the printer's storage and start-up station.

Referring briefly to FIG. 2, one embodiment of print head assembly 5 can be seen in more detail. The assembly 5 includes an upper print head portion including a print head body 21 mounted on housing 22 and having an inlet 23 for receiving ink. The body 22 has a passage leading to a print head cavity 24 and an outlet 29 leading from the cavity 24 to the ink circulation system of apparatus 1. The upper print head portion also includes and orifice plate 25 and suitable transducer means (not shown) for imparting mechanical vibration to the body 21. Such transducer can take various forms known in the art for producing periodic perturbations of the ink filament(s) issuing from the orifice plate 25 to assure formation break-up of the ink filaments into streams of uniformly spaced ink droplets.

The lower portion of print head assembly 5 includes a charge plate 26 constructed to impart desired charge upon ink droplets at the point of filament break-up and a drop catcher 27 having a face located to catch non-printing droplets (in this arrangement charged droplets).

The ink supply and circulation system of the FIG. 1 apparatus includes various ink conduits (i.e. lines) which form ink supply and return circulation paths. As illustrated schematically in FIG. 3, pump inlet line 71 extends from ink supply cartridge 8 to the inlet of pump 60, outlet line 72 extends between pump 60 and a main filter 69, head supply line 73 extends from main filter 69 to the print head inlet and head return line 74 extends from the print head outlet 29 to a junction between catcher return line 75 and the main ink return line 76. An ink return line 79 also extends from station 9 back to cartridge 8 via line 76. A flow restrictor 62 is provided in the head supply line 73 and a solenoid valve 64 is located in the head return line 74. An air bleed line 78 extends from main filter 61 back to cartridge 8 and an ink bypass line 77 extends from a juncture with line 78 also back to cartridge 8. As will be clear from the subsequent description, the present invention is not limited to use with the particular ink circulation line arrangement illustrated in FIG. 3. Other elements of the FIG. 3 embodiment, such as ink heater 61, final filter 63, temperature sensor 65 and pressure sensor 66 are not necessary for the practice of the present invention, but can be usefully incorporated with it.

Figure 3:
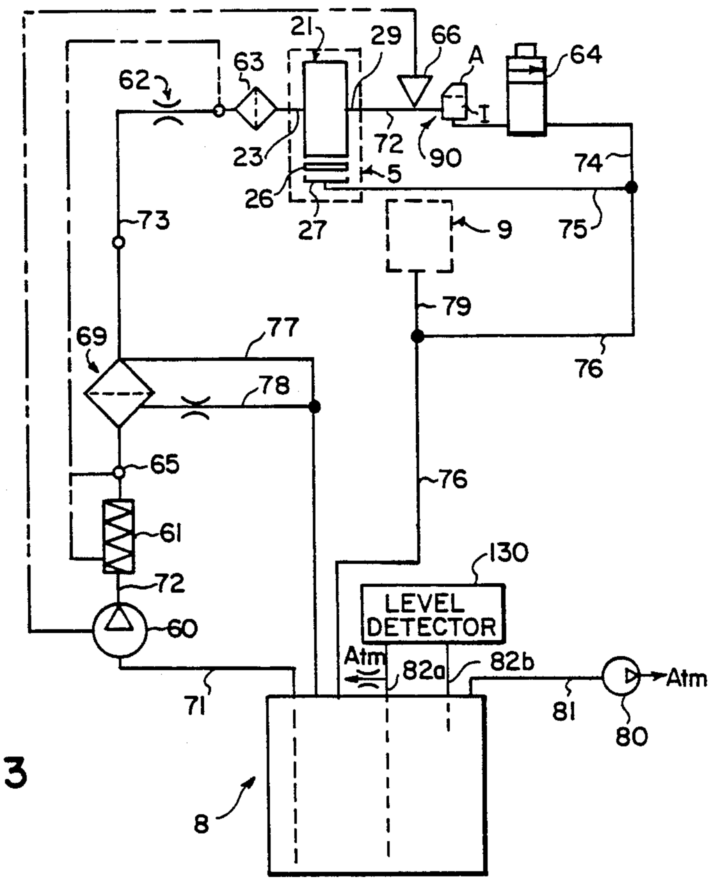
FIG. 3 is a diagrammatic illustration of the ink supply and circulation system of the apparatus shown in FIG. 1 incorporating one embodiment if the present invention.

As shown in FIGS. 1 and 3, cartridge 8 can be in a form that is constructed to be readily inserted and removed, as a unit, from operative relation with lines of the ink circulation system. For this purpose suitable couplings are formed on the cartridge 8 in a manner so as to operatively connect with lines 71, 76 and 77 upon insertion of the ink cartridge 8 into its mounting in the printer apparatus. Cartridge 8 also has a coupling to line 81 leading to vacuum pump 80 to render the main interior thereof at sub-atmospheric pressure. A detector 130 senses ink level in catridge 8 via lines 82*a* and 82*b*. However, the present invention can function equally well in a circulation system constructed with an internal venturi structure which effects return of ink from return line 76 such as is disclosed in more detail in U.S. Pat. No. 4,607,261.

Figure 4:
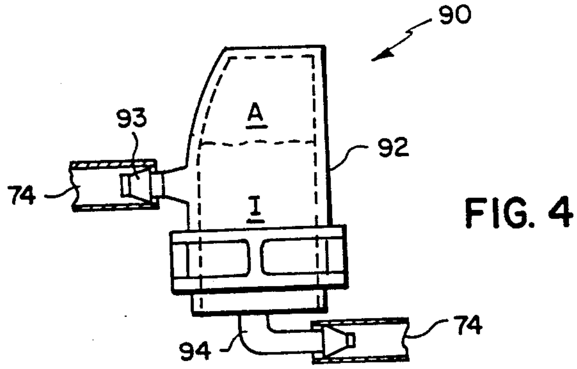
FIG. 4 is a cross-sectional view of one preferred damping device construction in accord with the present invention.

Referring again to FIG. 3 one preferred circulation system construction for reducing pressure transients in accord with the present invention is illustrated schematically. Thus, a pressure damper 90 is coupled into the outlet line 74 from the print head and is shown in more detail in FIG. 4. This pressure damper embodiment comprises wall means 92, which define an enclosed chamber, a side wall inlet 93 and a bottom wall outlet 94. The chamber formed by wall means 92 is mounted in the printer so that the inlet and outlet are both located near the chamber bottom portion (in its operative orientation in the printer), thereby gravity-disposing the enclosed fluids (e.g. ink I and air A) in the air-above-ink orientation illustrated. In operation, pressure surges in the ink lines proximate the print head are transmitted through line 81 to damper 90 where they are absorbed by the compression of the compressible fluid, here air A. The desirable effect of damper 90 can be used in cooperation with an ink flow restrictor such as shown at 62; however, the provision of an especially designed flow restrictor is not necessary to provide highly useful damping of the print head pressure transients.

In one preferred embodiment the chamber of damper 90 is constructed to have an empty volume of about 3.2 $cm.^3$ and the circulation system parameters are set so that the chamber contains about 1.8 $cm.^3$ during printing operation. Larger chamber volumes can be used to provide enhanced damping; however, the size of the chamber should be selected so that retained chamber pressure allows a quick shut down of ink flow. Also, it is desirable that the damper device 90 be located proximate the print head to avoid any substantial pulses evolving in the conduit therebetween.

An important aspect of the present invention is the combination of a damper device such as described above with a printer system which can selectively ingest air into the ink outlet line 72, e.g., such as described in U.S. Pat. No. 4,591,873. Thus in accord with the present invention, the damper 90, used in cooperation with such a system, and disposed on the outlet side of the print head, can be self replenishing as to air supply. This solves the intrinsic problem of prior art systems wherein the gas component is gradually absorbed in the liquid. Thus, in accord with the present invention, gas absorption does not cause a significant reduction in the pressure damping ability of the device 90.

One preferrred embodiment for self replenishment in accord with the present invention can be understood by further consideration of the start-up sequence of the printer with reference to FIGS. 2 and 3. The printer storage and start-up station 9 comprises a housing 30 having an air supply passage 31 and an ink sump cavity 32 formed therein. The housing 30 is located adjacent the printing path of print head assembly so that the print head assembly can be moved to the cooperative position overlying the housing (as shown in FIG. 2) by the translational drive means 7 (FIG. 1). The housing embodiment shown in FIG. 2 is movable between the dotted-line and solid-line positions (toward and away from the print head assembly), e.g. by up-down drive 35.

As shown in FIG. 2, the housing 30 includes sealing means 36 and 37 which are constructed and located to seal the interface regions of the conduit 31 and sump 32 with the print head assembly from the surrounding atmosphere when the housing is in the upper (dotted-line position). The ink sump 32 is aligned to receive ink issuing from the orifice plate and conduct it to return line 79. The conduit 31 is adapted to interfit with a mating air inlet 18 formed in the print head assembly. The air inlet 18 includes an air filter 19, which is adapted to filter air from a pressure source 17 prior to its passage through opening 16 to the orifice and charge plate region of the print head assembly. A ball valve 13 is biased to a normally closed position in air conduit 31 and is actuated to an open position by the pressure of the air from source 17 when the air source is on.

The structures just described function under the control of start-up and storage control 12, which can be, e.g. a portion of a microprocessor system (not shown) that controls the overall operation of apparatus 1. Thus, commencing the operational description in the course of a nominal printing operation sequence, print head assembly 5 is traversing across the print cylinder and ink is flowing in a plurality of stabilized droplet streams from orifice plate 25, past charge plate 26. Charge is imparted to droplets by charge plate 26 in accordance with a printing information signal and non-charged drops pass to the print medium, while charged drops are deflected into catcher 27. At this stage valve 64 is closed and ink is circulating from the catcher 27 back to cartridge 8 as described with respect to FIG. 3.

When it is desired to change apparatus 1 from a printing or standby condition to a storage condition (e.g. for an overnight period) an appropriate command is transmitted to control 12. In response to this command, control 12 signals drive 7 to translate the print head assembly to the position over the storage and start-up station 9 as shown in FIG. 2 (solid lines), with the charge plate operating in a catch-all-drops mode. The up-down drive 35 is next actuated to move housing 30 into the dotted-line position shown in FIG. 2, whereby the space surrounding print head assembly's orifice and charge plates and catcher are sealed from the atmosphere. Next, valve 64 is opened so that ink flows mainly through the cavity outlet and only weeps through orifice plate 25 to effect a wet print head storage mode as described in U.S. Pat. No. 4,626,869. Alternatively air can be introduced through passage 31 to dry the charge plate/orifice plate zone for storage.

The start-up cycle of apparatus 1, preparatory to recommencing of printing operations, can begin with the apparatus in one of the storage conditions just described. Upon receipt of an appropriate start-up command, control 12 actuates pump 60 and heater 61 to circulate and heat ink with valve 64 in an open condition. After the ink has reached proper temperature, valve 64 is closed to an extent that ink is forced through orifice plate 25 in a non-stable condition spraying in all directions and impacting the surfaces to the charge plate 26 and catcher 27. This cleans any dirt that may reside on those surfaces and redissolves any ink which may have dried upon the surfaces.

At this stage of the start-up operations, the cleaning techniques, e.g. of the kind described in U.S. Pat. No. 4,591,873 can be usefully implemented. To commence such procedures for cleaning the orifices of plate 25 and the adjacent interior portions of cavity 24, the valve 64 can be opened to allow the ink to cross-flush through the cavity at a rate that causes only a slight weeping of ink through the orifices of the plate 25 and the air source 17 can be actuated to pressurize the sealed region surrounding the print head assembly. Thus with the housing 9 in the dotted-line position control 12 provides air through conduit 31, air filter 19 and opening 16 into the region below the orifice plate's exterior surface. A flow restrictor (not shown) can be provided in the return line 79 from sump 32 to facilitate pressure control for the region beneath the orifice plate 25.

In the above-described conditions the fluid pressure differential across the orifices of plate 25 is in general equilibrium and can be selectively varied (e.g. by adjustment of the air source 17, the degree of opening of valve 64, the speed of ink supply pump 60 or the vacuum pump 80). Such adjustments can be oscillatory in nature so as to alternatively urge ink from the exterior side of the orifices to the cavity side of the orifices and from the cavity side to the exterior side. Such reversing flow of ink in the orifices is highly effective in cleaning the orifices, e.g. lifting particles trapped on the cavity side of the orifice plate into a cross-flush flow and out of the ink cavity. Moreover, the range of the varying pressure differentials across the orifice plate is selected to have periods wherein filtered air is introduced into the ink cavity 24 through the orifices. Such alternate ink weeping and air ingestion can be repeated one or more times to achieve good cleaning of the orifice plate and adjacent cavity interior.

A presently preferred procedure for providing the oscillating pressure differential across the orifice plate is to predeterminedly vary the voltage applied to the ink supply pump motor. This approach of providing air ingestion through the orifices can be implemented with valve 64 fully open, home station 9 in an open condition and vacuum pump in operation to return ink to the supply reservoir. In such condition, variations of pressure of ink supplied to the print head will rise above and below external print head pressure so that air will be ingested.

In accord with the present invention, print head cleaning cycles such as described above can be utilized to effect replenishment of the gas content of damper 90. Thus, air ingested through the print head orifices during these cleaning cycles will effectively resupply the damper chamber 90 when it is located along the ink return line from the print head. That is, the air ingested through the orifices during the cleaning sequence is swept out of the print head by the ink flowing through the print head. With the damper chamber located downstream of the print head as shown in FIG. 3, such ingested air refills the air chamber during each cleaning cycle. The regular frequency of printer cleaning cycles has been found completely adequate to prevent deterioration in the pressure damping system.

After orifice plate cleaning and damper replenishment by one of the above sequences, control 12 raises the pressure ejecting ink from orifice plate 26 to the nominal pressure, e.g. by closing of valve 64 and/or raising supply pump pressure and actuates air source 17 to introduce a pressurized, skiving air flow through conduit 31. A detailed explanation of preferred structure and procedure for implementing such air flow skiving and other preferred start-up procedures are described in U.S. Pat. No. 4,591,870. After completion of such start-up sequences, the printer is enabled to commerce print mode operations with the damper device in a condition to effectively reduce pressure transients incident to print head movements.

The invention has been described in detail with particlar reference to preferred embodiments thereof, but it will be understood that variations and modifications can be effected within the spirit and scope of the invention.

We claim:

1. In continuous ink jet printers of the kind having: (i) print head means, including an ink cavity, an ink inlet and outlet to said cavity and an orifice plate coupled to said cavity, and (ii) an ink circulation system having an ink supply conduit for supplying ink under pressure to said cavity inlet and an ink return conduit for receiving ink from said cavity outlet, a damping system construction for reducing ink pressure transients within said print head means, comprising:

(a) chamber means mounted in said printer for enclosing ink and a damping gas in a gas-over-ink disposition;
(b) means for coupling the enclosed interior of said chamber means to said ink return conduit at a location such that ink pressure transients occuring within said print head means are attenuated by gas in said chamber; and
(c) means for periodically introducing gas into said ink return conduit upstream of said chamber means.

2. The invention defined in claim 1 wherein said gas introducing means comprises means for causing air to flow through said orifices into said cavity.

3. The invention defined in claim 1 wherein said chamber is constructed along said ink return line proximate said print head outlet.

4. The invention defined in claim 3 further comprising means for producing pressure differentials across said orifice plate that alternately urge (i) ink from the cavity side to the exterior side of said orifice plate and (ii) air from the exterior side to the cavity side of said orifice plate, whereby extraneous particles are cleaned from the orifice(s) of said plate and air is supplied to replenish the gas content of said chamber.

5. The invention defined in claim 4 wherein said pressure differential producing means including means for enclosing a region around the exterior side of said plate and means for varying the air pressure in said region.

6. The invention defined in claim 4 wherein said pressure differential producing means comprise means for varying the pressure of ink supply to said print head.

7. In continuous ink jet printers of the kind having a (i) print head, including an ink cavity, an ink inlet and outlet to said cavity and an orifice plate coupled to said cavity, (ii) an ink circulation system having an ink supply conduit for supplying ink under pressure to said cavity inlet and an ink return conduit receiving ink from said cavity outlet and (iii) carriage means for translating said print head and umbilical portions of said supply and return conduits along a print path, a system for damping ink pressure transients occuring within said umbilical conduit portions and said print head, said system comprising:

(a) means, mounted in said printer, for forming an enclosed fluid chamber containing ink and air;
(b) means for coupling the enclosed interior of said chamber to said ink return conduit; and
(c) means for introducing air into said return conduit through said orifice plate.

8. The invention defined in claim 7 wherein said chamber defining means is located proximate said print head and constructed to that, in the operative orientation of said printer, ink and gas introduced into said chamber will gravity-orient to an air-above-liquid disposition.

* * * * *

UNITED STATES PATENT AND TRADEMARK OFFICE
CERTIFICATE OF CORRECTION

PATENT NO. : 4,837,585

DATED June 6, 1989

INVENTOR(S) : Theodore F. Williams et al

It is certified that error appears in the above-identified patent and that said Letters Patent is hereby corrected as shown below:

Column 7, line 26, after "inlet" insert -- to discharge a continuous stream of ink drops from said orifice plate --.

Column 8, line 23, after "under" insert -- continuous --.

Column 8, line 24, after "inlet" insert -- to discharge a continuous stream of ink drops from said orifice plate --.

Signed and Sealed this

Nineteenth Day of June, 1990

*Attest:*

HARRY F. MANBECK, JR.

*Attesting Officer*

*Commissioner of Patents and Trademarks*